United States Patent

Komatsu et al.

[11] Patent Number: 5,912,032
[45] Date of Patent: *Jun. 15, 1999

[54] PROCESS OF PRODUCING CALCIUM-SUPPLEMENTED MILK DRINKS

[75] Inventors: Yoshinori Komatsu, Miyazaki-ken; Tadashi Nakatsubo, Tokyo; Hideo Ohtomo; Tamotsu Kuwata, both of Saitama-ken, all of Japan; Mark Mitchell Davis, St. Peter; Martin Edward Davis, Tonka Bay, both of Minn.

[73] Assignees: Meiji Milk Products Company, Limited, Tokyo, Japan; Davisco Foods International, Inc., Le Sueur, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/646,064

[22] Filed: May 7, 1996

[30] Foreign Application Priority Data

May 11, 1995 [JP] Japan .................................. 7-113379

[51] Int. Cl.⁶ .................................................. A23C 21/10
[52] U.S. Cl. ......................... 426/74; 426/522; 426/580; 426/583
[58] Field of Search .............................. 426/74, 580, 583, 426/522

[56] References Cited

U.S. PATENT DOCUMENTS

| | | |
|---|---|---|
| 2,570,231 | 10/1951 | Hansen . |
| 2,871,123 | 1/1959 | Bauer et al. . |
| 4,840,814 | 6/1989 | Harada et al. . |
| 5,204,134 | 4/1993 | Girsh ........................ 426/580 |

FOREIGN PATENT DOCUMENTS

| | | |
|---|---|---|
| 0273485 | 7/1988 | European Pat. Off. . |
| 0408756 | 1/1991 | European Pat. Off. . |
| 4113836 | 1/1992 | Germany . |
| 57-035945 | 7/1982 | Japan . |
| 57-110167 | 7/1982 | Japan . |
| 60-248152 | 12/1985 | Japan . |
| 62-248450 | 10/1987 | Japan . |
| 63-173556 | 7/1988 | Japan . |

OTHER PUBLICATIONS

B. Webb et al., Byproducts from milk 1970, AVI Publishing Co., Westport, CT, pp. 363–369.
Database WPI, Week 9138 Derwent Publications Ltd., London, GB; AN 86–025443 & JP 60/248,152 (Meiji Milk Products KK) Abstract.
Patent Abstracts of Japan, vol. 14, No. 406 (C–754), Sep. 4, 1990) & JP–A–02 154,639 (San Ei Chem Ind) Abstract.
Database WPI Week 9145 Derwent Publications Ltd., London, GB; AN 91–329,077 & JP–A–03 219,835 (Chugai Pharmaceutical KK) Abstract.
Database WPI Week 8821 Derwent Publications Ltd., London, GB; AN 88–142,010 & JP–A–63 087,944 (Chugai Pharmaceutical KK) Abstract.
Patent Abstracts of Japan vol. 15, No. 256 (C–845), Jun. 28, 1991 & JP–A–03 083,564 (Kyodo Nyugyo KK) Abstract.
Patent Abstracts of Japan vol. 17, No. 551 (C–1117), Oct. 5, 1993 & JP–A–05 155,774 (Meiji Milk Prod Co.) Abstract.
Maubois, J.L. et al., "Industrial fractionation of main whey proteins.", Bulletin of the IDF 212, session VI, ch. 24, pp. 154–159.
Chemical Abstracts, "Effect of the temperature of preliminary heating and additions of salts on the thermal stability of milk.", abs. No. 76578n, vol. 81, No. 13, p. 358 (Sep. 30, 1974).
"Milk flavor improvement", abstract of JP 74–17587, Food Techology, p. 111 (Oct. 1974).
Patent Abstract of Japan Application #57–33540, vol. 06, No. 102 (Jun. 11, 1982).

*Primary Examiner*—Helen Pratt
*Attorney, Agent, or Firm*—Browdy and Neimark

[57] ABSTRACT

A process for producing a calcium-supplemented milk drink, by adding to cow's milk, a whey mineral being of a calcium content of 2 to 8% by weight and produced by removing the protein and lactose from whey and concentrating the resulting whey by ultrafiltration and/or microfiltration. By the process, there is produced a calcium-supplemented milk drink having good flavor with no precipitate of calcium salts or being provided with attractive flavor, and being capable of passing through the sterilization process to be prepared into a commercially aseptic state.

9 Claims, No Drawings

PROCESS OF PRODUCING CALCIUM-SUPPLEMENTED MILK DRINKS

BACKGROUND OF THE INVENTION

1. Field of the Invention

The present invention relates to a process for producing calcium-supplemented milk drinks, and more specifically, the present invention relates to a process for producing calcium-supplemented milk drinks with good flavor and with no precipitation of calcium salts.

2. Description of the Prior Art

As the principal component of bone and teeth of animals, calcium is an essential element for organisms. It is required that human adults should take a rate of 1.0 g/day while little children should take a rate of 0.6 g/day. In recent years in Japan, the shortage of calcium intake has been remarked, which is a serious problem with relation to osteoporosis.

Nutritionally, cow's milk is essentially a good foodstuff, and if the milk is supplemented with calcium, the calcium shortage can be supplemented by less intake of such milk. The supplementing process in the process of producing calcium-supplemented milk includes the following;

1. a process of adding a soluble calcium salt to cow's milk after heat sterilization, and
2. a process of adding an insoluble calcium salt which is unreactive with milk protein, such as calcium phosphate and calcium carbonate, followed by heat sterilization of the milk.

However, process 1 is disadvantageous in that because the uniquely unattractive flavor of soluble calcium salts such as calcium chloride affects the taste of cow's milk, only a limited amount of these salts can be added to the milk. Furthermore, because ionized calcium reacts with casein and whey protein consequently to decrease the heat resistance of the milk, a sterilization process to prepare a commercially aseptic state is never applicable to the milk. Thus, the milk cannot be prepared as a long-life type. A process is known comprising individually sterilizing milk base and calcium under heat and subsequently mixing them together, but the procedures involved are laborious. Because calcium ions promote the modification of protein into unstable protein and promote also the precipitation thereof even at lower temperatures, furthermore, the amount of calcium ions to be added to the milk is limited so that the milk cannot be supplemented with a satisfactory amount of calcium.

Alternatively, process 2 is problematical in that rough feeling may be caused in the milk unless a particle size of the insoluble calcium salts is very small and in that the calcium salts may readily precipitate because of their insolubility. So as to overcome the problems of the insolubility, various processes have been suggested, for example, a process comprising adding 0.01 to 0.06% by weight of a stabilizer such as carrageenan and gum guar to cow's milk (Japanese Patent Laid-open No. Sho 62-248450): a process comprising depositing insoluble calcium salts in fine particles onto fat spheres in the emulsion of a fat and water or comprising embedding the salts into the fat spheres in the emulsion to adjust the specific gravity of these particles approximately to the specific gravity of the liquid phase (Japanese Patent Laid-open No. Sho 57-110167): a process comprising adding crystalline cellulose to the milk to prepare a fine network structure in the liquid phase, thereby supporting the insoluble calcium salts in fine particles to prevent the precipitation thereof (Japanese Patent Publication No. Sho 57-35945): or a process comprising mixing calcium carbonate in slurry with an aqueous solution of a hydrophilic emulsifier, and subsequently subjecting the mixture solution to a dehydration process, prior to vacuum drying, whereby the aggregation can be prevented (Japanese Patent Laid-open No. Sho 63-173556). However, all of these prior processes have the disadvantage of modifying the properties of cow's milk itself, increasing the calories of cow's milk so that it is not suitable for low-fat milk, or escalating the production cost.

Because it is difficult to prevent the precipitation of calcium salts in general, a process for supplementing cow's milk with calcium is suggested, comprising supplementing milk with fine particles of calcium phosphate or calcium citrate which are recovered from whey as a byproduct of cheese production, characterized in that no precipitation occurs (Japanese Patent Laid-open No. Sho 60-248152). These calcium salts are in a network structure so the salts can keep their stable state with substantially no generation the precipitate from solution. Additionally, the calcium salts are not water-soluble because of their non-ionic state, so that the salts do not react with protein and no precipitation occurs. Because the salts are not crystalline, their network structure can be maintained as is. The salts never crystallize to cause precipitation.

Since the network structure per se of the calcium salts secondarily binds together to be modified into a polymerized state, the salts may therefore precipitate consequently. So as to prevent such precipitation, it is required to preliminarily mix the salts with fat. Due to the consequent calorie increase, the resulting milk is not suitable as low-fat milk, disadvantageously; or the production cost is elevated, disadvantageously.

Problems to Be Solved by The Invention

Thus, it is an object of the present invention to provide a process for producing a calcium-supplemented milk drink without the aforementioned drawbacks.

Means for Solving the Problems

The prevent inventors have found that by adding to cow's milk or the like, a whey mineral generated from whey and containing a good balance of insoluble calcium salts and soluble calcium salts and additionally containing a good balance of minerals other than calcium, the flavor of the milk of itself is improved with no precipitation of the calcium salts, whereby a long-life type of milk can be prepared. Thus, the present invention has been achieved.

More specifically, the present invention is to provide a process for producing a calcium-supplemented milk drink, comprising adding whey mineral having a calcium content of 2 to 8% by weight to cow's milk or the like.

The present invention will be described in detail.

Any whey mineral having a calcium content of 2 to 8% by weight may be used in accordance with the present invention, including, for example, a whey mineral produced by removing protein and lactose from whey and subsequently concentrating the resulting product by ultrafiltration, microfilration or other way, and a whey mineral produced by concentrating whey with a centrifuge.

Whey mineral can be produced from whey such as cheese whey, for example, Gouda cheese whey, cheddar cheese whey and the like; and acid whey, for example, lactate whey, hydrochloride whey and the like.

Protein can be removed from whey by routine processes (deproteination), for example by the use of ion exchangers and by means of filtration and concentration. More specifically, such a process comprises mixing whey with a cation exchanger thoroughly washed with an alkali such as 0.1N sodium hydroxide and subsequently with desalted water, and agitating the resulting mixture. Then, the resulting mixture is preferably adjusted to pH 2 to 5 by using an acid such as 6N sulfuric acid. Subsequently, the cation exchanger is filtered off, and the resulting filtrate is concentrated to a final solid content of about 40 to 60%, by using a rotary evaporator or the like.

The deproteination of whey may also be conducted by ultrafiltration. The ultrafiltration for such deproteination comprises solubilizing the calcium salts in whey, preferably under conditions of acidity pH 6 or less, so as to recover the product in the pass-through fraction. The deproteination may be carried out by microfiltration, but ultrafiltration is more advantageous in terms of the efficiency of deproteination, etc.

Lactose may be removed from whey by routine processes, including for example a process comprising adding lactose to whey to crystallize the lactose therein and then filter off the crystallized lactose. Preferably, lactose in the arm of fine particles should be added to whey. Lactose may be crystallized by routine processes, including for example a process comprising adding seed lactose at a ratio of 0.01 to 0.1% to the solids of a whey solution adjusted to a solid concentration of 40 to 60%, subsequently stirring the mixture solution gently and allowing the solution to stand at 0 to 7° C. for 10 hours or more.

Calcium may be concentrated at a preferable pH of 6.0 to 9.0 by ultrafiltration, microfiltration or the like. Whey should be concentrated by ultrafiltration or microfiltration, so that the final calcium content in the whey mineral might be of 2 to 8% by weight, preferably 4 to 6% by weight. If the content is less than 2% by weight, the ratio of the blended whey mineral to cow's milk or the like is so elevated that the heat resistance of the resulting product possibly may be deteriorated under the influence of the minerals other than calcium. If the content is more than 8% by weight, calcium may possibly precipitate during the storage of the resulting product for a short term. If whey mineral having a desired calcium level cannot be generated by a single process of ultrafiltration or microfiltration, the process may satisfactorily be repeated.

The whey mineral having a calcium content of 2 to 8% by weight may be generated by centrifuging. For example, by adjusting whey deproteinized via a cation exchanger or untreated whey to pH 6 to 9 and then centrifuging the pH-adjusted whey at 10,000 g for about 10 minutes, calcium can be recovered together with aggregated protein and complexes of protein with lipids. Alternatively, by adjusting the calcium concentration and pH of whey to desired levels and subsequently heating gently the whey prior to centrifuging, a calcium fraction may be recovered similarly (Bulletin of the International Dairy Federation 212, Chapter 24, Session VI, p.154, 1987).

The whey mineral thus recovered contains well-balanced insoluble calcium salts and soluble calcium salts, and contains additionally minerals other than calcium, such as potassium, sodium, magnesium and the like.

In accordance with the present invention, the whey mineral described above is added to cow's milk or the like. The term "cow's" milk or the like includes cow's milk, specific cow's milk, partially defatted milk, defatted milk (skimmed milk), defatted powdered milk, reconstituted milk, recombined milk, processed milk, milk drink and the like; and for defatted powdered milk, for example, the whey mineral and defatted powdered milk may be added to water. The whey mineral is then preferably added in such an amount that the content of the calcium derived from the whey mineral is 10 to 40 mg %, preferably 20 to 30 mg % in the resultant calcium-supplemented milk drink (the unit "mg %" represents a content of the supplemented calcium in 100 g of the resultant calcium-supplemented milk drink). When the amount thereof to be added is more than 40 mg %, the heat resistance may be deteriorated or calcium may possibly precipitate.

The whey mineral added to cow's milk or the like should preferably be homogenized by routine processes. The homogenizing processes may be carried out by means of a homogenizer for general use. The homogenization may preferably be conducted at 40° C. or less. When the homogenization is carried out at higher temperatures, free calcium may potentially make casein unstable so the aggregation of casein is eventually observed before the sterilization process described below. When the homogenization is carried out at a low temperature of 40° C. or less, stable complexes of casein, and the whey protein and the calcium of the whey mineral may be formed to possibly put the casein into a relatively stable state before the sterilization process or during the process.

The calcium-supplemented milk drink thus produced is preferably adjusted to pH 6.0 to 7.5, specifically pH 6.5 to 7.2. Through the pH adjustment, the deterioration of the heat resistance, browning during heating or decomposition of the protein can be prevented. Under general conditions, the pH of the resulting product should be within the range described above, but if necessary, pH adjustment may be effected using sodium hydroxide, potassium hydroxide and the like.

By sterilizing the thus produced calcium-supplemented milk drink to a substantially sterile state (a commercially aseptic state) and aseptically introducing the milk into containers or the like, the milk drink may be prepared as a calcium-supplemented long-life Milk drink, which can be stored even at ambient temperature for several months. The sterilization may be carried out satisfactorily by routine processes, for example a process of continuous heating at ultra-high temperatures (UHT) under the conditions of 130 to 150° C. for 1 to 10 seconds. If the calcium content of the whey mineral is preliminarily adjusted to 2 to 8% by weight by the process of the present invention, the heat resistance can be maintained well. Hence, a relatively long time will be needed even if the sterilization is carried out as described above, until the aggregation initiates. Thus, no scorching of the protein onto sterilizing machines, no precipitation of the sterilized solutions, or no formation of aggregates may occur.

Because calcium is supplemented by the use of the whey mineral in the calcium-supplemented milk drink produced by the process described above in accordance with the present invention, the milk drink has good flavor with no precipitation of calcium salts or with no rough feeling. Such good flavor is understood from the facts that whey mineral is used as an alternative seasoning to table salt; and that the whey mineral is a co-precipitate of the mineral components with the residual phospholipids and other fat-soluble components in the whey. Thus, by adding the aforementioned whey mineral into cow's milk or the like, specifically a low-fat milk prepared by using a partially defatted milk, a defatted milk (skimmed milk), a defatted powdered milk or the like as the principal raw material, the resulting milk can have a body similar to the original body of milk fat, together with good flavor similar to the flavor of cow's milk. Because the milk drink can pass through high-temperature sterilization processes, additionally, the milk drink can be prepared into a calcium-supplemented long-life milk drink.

The present invention will now be described in examples, but the scope of the present invention is not limited to these examples.

DESCRIPTION OF THE PREFERRED EMBODIMENTS

Production Example 1

Twenty liters of Gouda cheese whey was poured into 4 liters of a cation exchanger (Indion S3, manufactured by Life Technology Inc.), washed with 0.1N NAOH and thoroughly washed with desalted water. The mixture was agitated in a tank and the pH adjusted to pH 3.0 with 6N $H_2SO_4$. Subsequently, the cation exchanger was filtered off. The resulting filtrate was concentrated to a final solid content of 40% by means of an evaporator (thus-obtained product is referred to as "a partially deproteinized solution").

After 1 g of finely ground lactose was added to the concentrated solution, the mixture was then agitated at 2° C. for 18 hours to crystallize the lactose therein. The crystallized lactose was filtered off, and the resulting filtrate was freeze-dried, to recover a composition shown in Table 1 (Whey mineral No. 1) at a yield of 350 g.

TABLE 1

| Whey mineral No. 1 | |
| --- | --- |
| Water content | 2.0 % by weight |
| Protein | 14.5 % by weight |
| Ash content | 30.2 % by weight |
| Fat | 4.2 % by weight |
| Carbohydrates* | 49.1 % by weight |
| Calcium | 1.4 % by weight |

*balance to 100%

Production Example 2

After the pH of a partially deproteinized solution recovered in the same manner as in the Production Example 1 was adjusted to pH 8.0 with 6N NaOH, the resulting solution was concentrated by 10 fold with an ultrafiltration membrane of a fractional molecular weight of 20,000 (LAB-20.0.72, GR61PP of a membrane area of 0.36 $m^2$, manufactured by DDS, Co., Ltd.). After furthermore desalted water of a 10-fold volume to that of the concentrated solution was added, the resulting solution was concentrated again by 10 fold at pH 8.0. By freeze-drying the resulting concentrated solution, a composition shown in Table 2 (Whey mineral No. 2) was recovered at a yield of 100 g.

TABLE 2

| Whey mineral No. 2 | |
| --- | --- |
| Water content | 2.0 % by weight |
| Protein | 51.9 % by weight |
| Ash content | 29.9 % by weight |
| Fat | 12.3 % by weight |
| Carbohydrates* | 3.9 % by weight |
| Calcium | 4.2 % by weight |

*balance to 100%

Production Example 3

Gouda cheese whey (1,000 kg) was concentrated by 20 fold at pH 6.0 by using the same ultrafiltration membrane as in the Production Example 2, and the pass-through solution was concentrated with an evaporator, and lactose was crystallized and removed in the same manner as in the Production Example 1. After diluting the mother solution with desalted water to a final solid content of 10% and adjusting the resulting solution to pH 8.0 with 6N NaOR, the solution was again subjected to an ultrafiltration procedure. At concentration ratios of 5, 6, 7 and 10, some of the individual concentrated solutions recovered were freeze-dried, to generate compositions shown in Table 3 (Whey minerals Nos. 3-1, 3-2, 3-3, and 3-4, at concentration ratios of 5, 6, 7, and 10, respectively).

TABLE 3

| Components | Whey mineral 3-1 (UF × 5) | Whey mineral 3-2 (UF × 5) | Whey mineral 3-3 (UF × 7) | Whey mineral 3-4 (UF × 10) |
| --- | --- | --- | --- | --- |
| Water content | 1.5 | 2.0 | 2.0 | 1.8 |
| Protein | 10.1 | 16.6 | 18.0 | 22.1 |
| Ash content | 24.0 | 22.2 | 21.8 | 20.5 |
| Fat | 0.3 | 0.8 | 0.9 | 1.2 |
| Carbohydrates* | 64.1 | 58.4 | 57.3 | 54.4 |
| Calcium | 2.4 | 6.6 | 7.4 | 9.6 |

*balance to 100%
(unit; % by weight)

Production Example 4

Gouda cheese whey (500 kg) was adjusted to pH 7.2, and the whey was allowed to stand at 55° C. for 10 minutes. The resulting whey was supplied at a feed of 50 kg/h into a centrifuge (LAPX202, manufactured by α-Laval Co. Ltd.) at 80,000 rpm. By drawing out the precipitate every hour and freeze-drying the precipitate, a composition shown in Table 4 (Whey mineral No. 4) was recovered at a yield of 1.8 kg.

TABLE 4

| Whey mineral No. 4 | |
| --- | --- |
| Water content | 4.1 % by weight |
| Protein | 15.7 % by weight |
| Ash content | 16.6 % by weight |
| Fat | 3.8 % by weight |
| Carbohydrates* | 59.8 % by weight |
| Calcium | 2.7 % by weight |

*balance to 100%

EXAMPLE 1

Testing of Heat Resistance

Defatted powdered milk (10.3 g) (manufactured by Meiji Milk Products, Co., Ltd.) was dissolved in a small volume of desalted water, add one of the whey minerals produced in the Production Examples 1 to 4 (Whey Minerals Nos.1, 2, 3-1, 3-2, 3-3, 3-4, and 4) was added to the solution to give a final calcium content of 20 to 50 mg. Desalted water was further added to the solution to give a final total weight of 100 g. The mixture solution was then agitated and mixed together with an Excel auto-homogenizer (manufactured by Nippon Seiki, Co., Ltd.) at 10,000 rpm for 3 minutes, to prepare a sample for the testing of heat resistance.

Using a shaking-type heat resistance tester (manufactured by Ishiyama Scientific Machinery Industries), the test of heat resistance was carried out at an oil-bath temperature of 135° C. (or 140° C.). The heat resistance was shown as the time (CT in unit minute) required for the coagulation firstly observed in a sample solution. All the sample pHs were within a range of 6.6±0.1. The results are shown in Table 5.

TABLE 5

Relation between calcium level derived from whey mineral and coagulation time (CT in unit minute)

| Ca level from whey mineral | Control CaCl$_2$ | Whey mineral No. 1 | Whey mineral No. 2 | Whey mineral No. 3-1 | Whey mineral No. 3-2 | Whey mineral No. 3-3 | Whey mineral No. 3-4 | Whey mineral No. 4 |
|---|---|---|---|---|---|---|---|---|
| 20 mg % | 2.50 | 5.00 | 6.50 | 5.00 | 7.00 | 6.25 | 6.50 | 5.25 |
| 25 mg % | 2.00 | 4.25 (2.00) | 5.00 | 4.75 (2.75) | 6.00 | 5.50 | 5.75 | 6.00 |
| 30 mg % | — | 3.25 (1.75) | 4.75 (3.50) | 4.50 (2.00) | 5.00 (3.75) | 5.00 | 5.25 | 5.00 |
| 35 mg % | — | 3.00 | 4.25 (3.00) | 4.00 | 4.50 (3.25) | 4.75 (3.25) | 4.50 (3.00) | 4.25 |
| 40 mg % | — | 2.75 | 4.00 (2.00) | 4.00 | 4.25 (2.00) | 4.00 (2.00) | 4.25 (2.00) | 4.00 |
| 45 mg % | — | 2.00 | 2.50 | 2.50 | 3.00 | 2.25 | 3.50 | 3.00 |
| 50 mg % | — | 2.00 | 2.00 | 2.00 | 2.50 | 2.00 | 2.00 | 2.00 |

Note:
The FIGS. in parenthesis represent CTs at an oil-bath temperature of 140° C.

When pouring the solution into a sterilizing machine, the CTS exhibited no occurrence of scorching of protein onto the plate. The precipitation of the sterilization solutions, or formation of aggregates were 4.00 minutes and 2.00 minutes at 135 and 140° C., respectively. The Whey mineral Nos. 2, 3-1, 3-2, 3-3, 3-4 and 4 thus exhibit heat resistance.

EXAMPLE 2
Testing of Calcium Precipitation

Centrifuging samples with good heat resistance as shown in Example 1, namely samples of the Whey mineral Nos. 2, 3-1, 3-2, 3-3, 3-4 and 4, at 1,600 g for 10 minutes, the calcium levels of the supernatants were assayed. As a control, a sample with addition of calcium chloride (a soluble calcium salt) was assayed in the same fashion as described above. The results are shown in Table 6.

TABLE 6

| Ca level from whey mineral | Control CaCl$_2$ | Whey mineral No. 2 | Whey mineral No. 3-1 | Whey mineral No. 3-2 | Whey mineral No. 3-3 | Whey mineral No. 3-4 | Whey mineral No. 4 |
|---|---|---|---|---|---|---|---|
| 20 mg % | 151 | 148 | 148 | 147 | 148 | 135 | 149 |
| 30 mg % | 160 | 159 | 161 | 160 | 156 | 138 | 158 |
| 40 mg % | 172 | 167 | 165 | 166 | 163 | 137 | 169 |
| 50 mg % | 179 | 175 | 174 | 176 | 170 | 139 | 178 |

(unit: mg %)

As shown in Table 6, the samples of Whey minerals Nos. 2, 3-1, 3-2, 3-3 and 4 each at a calcium content of 2 to 8% by weight retained almost the same level of calcium in the supernatants thereof even after centrifuging, as in the control with the soluble calcium salt. Thus, it is indicated that no precipitation of calcium salts may occur. As shown in the Example 1, the Whey minerals Nos. 2, 3-1, 3-2, 3-3 and 4 also have heat resistance, so that it can be said that these minerals are preferred calcium-supplementing sources.

EXAMPLE 3

Whey mineral No. 3-2 (455 g) and a defatted powdered milk (10.3 kg) was dissolved in water (89 kg) at 23° C. The resulting mixture was homogenized in two steps (a first step at 100 kg/cm$^2$ and a second step at 50 kg/cm$^2$). The homogenized solution was sterilized under the conditions of 140° C. for 4 seconds by means of a UHT manufactured by Iwai Machinery Industry, Co. Ltd. Then, no pressure decrease or the like possibly due to the scorching of the protein on the sterilizing machine was observed. Three months after the storage of the resulting sterilized solution at ambient temperature in an aseptic state, no occurrence of rough feeling or abnormal taste or odor was observed.

After centrifuging the calcium-supplemented milk drink at 1,600 g for 10 minutes immediately after sterilization, the calcium level in the supernatant was assayed together with the precipitate weight in percent. The same assay was conducted three months after the drink was left to stand at ambient temperature. For a control, calcium chloride was used in place of the whey mineral (with no sterilization treatment). The results are shown in Table 7.

EXAMPLE 4

Dissolving the Whey mineral No. 2 (71 g) and a defatted powdered milk (1.03 kg) in water (8.9 kg) at 24° C., the resulting mixture was treated in the same manner as in Example 3. No pressure decrease or the like possibly due to the scorching of the protein on the sterilizing machine was observed. Three months after the resulting solution was left to stand at ambient temperature, no occurrence of rough feeling or abnormal taste or odor was observed.

Centrifuging the resulting product in the same manner as in Example 3, immediately after the sterilization and three months after the product was left to stand at ambient temperature, the calcium level in the supernatant was assayed together with the precipitate weight in percent. The results are shown concurrently in Table 7.

TABLE 7

|  | Example 3 | Example 4 | Control CaCl$_2$ |
|---|---|---|---|
| Ca level immediately after sterilization | 155 mg % | 157 mg % | 159 mg % |
| Precipitate weight immediately after sterilization | 0.15 wt % | 0.20 wt % | 0.85 wt % |
| Ca level after 3-month simple storage at ambient temperature | 152 mg % | 154 mg % | — |
| Precipitate weight after 3-month simple storage at ambient temperature | 0.21 wt % | 0.23 wt % | — |

As shown in Table 7, the samples using the whey minerals of the Production Examples have less precipitate of calcium salts, and the levels of the precipitate do not change after the long-term storage.

Five skilled panelists tested the flavor of the calcium-supplemented milk drinks of the Examples 3 and 4 of the present invention and the flavor of the control using calcium chloride. Consequently, all the panelists judged that the products of the present invention had stronger body and better flavor than those of the control.

EXAMPLE 5

As in Examples 3 and 4, the same experiments were conducted using commercially available whey minerals. When the Ca concentration from the whey minerals and the Ca concentration from defatted powdered milk were given at 30 mg % and 130 mg %, respectively, the coagulation time at 135° C. and the Ca concentration in the supernatant after centrifuging were determined, as shown in Table 8.

"Versapro E" of a Ca content of 5% had excellent heat resistance with less Ca precipitate, compared with other whey minerals. No abnormal sterilizing machine, no occurrence of rough feeling phenomenon under storage, or no abnormal taste or odor was observed; almost no Ca precipitation was observed under storage.

TABLE 8

Composition and coagulation time of commercially available whey minerals and Ca concentration in the supernatant after centrifuge

|  | Ca content (%) | Coagulation time (min.) | Ca concentration in supernatant (mg %) |
|---|---|---|---|
| Meiji whey powder (Meiji Milk Products Co., Ltd.) | 1.2 | 2.00 | 156 |
| Suval (Valio Ltd.) | 1.6 | 2.75 | 155 |
| Versapro E (DAVISCO Foods International, Inc.) | 5.0 | 5.50 | 158 |
| Capolac (MD Foods Ingredients amba) | 18.0 | 6.00 | 138 |
| Mini flow 34 Plus (FDA Co., Ltd) | 30.0 | 5.75 | 135 |

EFFECTS OF THE INVENTION

In accordance with the present invention, there is provided a calcium-supplemented milk drink, having good flavor with no precipitation of calcium salts or being provided with attractive flavor, and additionally being capable of passing through the sterilization process to be prepared into a commercially aseptic state.

What is claimed is:

1. A process for producing a calcium-supplemented cow's milk drink comprising:
   (a) obtaining a whey mineral having a calcium content of 2–8% by weight by a method comprising:
      (i) removing protein from whey using a cation exchanger or by ultrafiltration;
      (ii) concentrating the whey obtained in step (i);
      (iii) removing lactose from the concentrate obtained in step (ii);
      (iv) adding desalted water to the concentrate obtained in step (iii) to produce a dilution;
      (v) adjusting the pH of the dilution obtained in step (iv) to 6.0–9.0
      (vi) subjecting the pH-adjusted dilution from step (v) to a filtration step selected from the group consisting of ultrafiltration and microfiltration, thereby obtaining a retentate; and
      (vii) drying said retentate; and
   (b) adding the whey mineral obtained in (1) to cow's milk to form a calcium-supplemented cow's milk drink wherein the calcium supplied by the whey mineral is 10–40 mg % in the calcium-supplemented cow's milk drink, adjusting the pH of the calcium-supplemented cow's milk drink to 6.0–7.5, and sterilizing the calcium-supplemented cow's milk drink.

2. A process for producing a calcium-supplemented cow's milk drink according to claim 1, wherein the cow's milk is selected from the group consisting of partially defatted cow's milk, defatted cow's milk, defatted powdered cow's milk, reconstituted cow's milk, recombined cow's milk, and processed cow's milk.

3. A process for producing a calcium-supplemented cow's milk drink according to claim 1, wherein the fractional molecular weight of the product obtained from the ultrafiltration in step (a)(i) and from the filtration in step (a)(vi) is 20,000.

4. A process for producing a calcium-supplemented cow's milk drink according to claim 3, wherein the cow's milk is selected from the group consisting of partially defatted cow's milk, defatted cow's milk, defatted powdered cow's milk, reconstituted cow's milk, recombined cow's milk, and processed cow's milk.

5. A process for producing a calcium-supplemented cow's milk drink according to claim 3, wherein the cow's milk is selected from the group consisting of partially defatted cow's milk, defatted cow's milk, defatted powdered cow's milk, reconstituted cow's milk, recombined cow's milk, and processed cow's milk.

6. A process for producing a calcium-supplemented cow's milk drink comprising:
   (a) obtaining a whey mineral having a calcium content of 2–8% by weight by a method comprising:
      (i) removing protein from whey using a cation exchanger or by ultrafiltration;
      (ii) adjusting the pH of the resultant whey obtained in step (i) to 6.0–9.0;
      (iii) subjecting the pH-adjusted whey from step (ii) to a filtration selected from the group consisting of ultrafiltration and microfiltration, thereby obtaining a retentate; and
      (iv) drying the obtained retentate; and
   (b) adding the whey mineral obtained in step (a) to cow's milk to form a calcium-supplemented cow's milk drink wherein the calcium supplied by the whey mineral is 10–40 mg % in the calcium-supplemented cow's milk drink to 6.0–7.5, and sterilizing the calcium-supplemented cow's milk drink.

7. A process for producing a calcium-supplemented cow's milk drink according to claim 6, wherein the cow's milk is selected from the group consisting of partially defatted cow's milk, defatted cow's milk, defatted powdered cow's milk, reconstituted cow's milk, recombined cow's milk, and processed cow's milk.

8. A process for producing a calcium-supplemented cow's milk drink according to claim 6 wherein the fractional molecular weight of the product obtained from the ultrafiltration in step (a)(i) and from the filtration in step (a)(vi) is 20,000.

9. A process for producing a calcium-supplemented. cow's milk drink according to claim 8, wherein the cow's milk is selected from the group consisting of partially defatted cow's milk, defatted cow's milk, defatted powdered cow's milk, reconstituted cow's milk, recombined cow's milk, and processed cow's milk.

* * * * *